W. A. FOSS.
ARTIFICIAL BAIT.
APPLICATION FILED NOV. 5, 1920.

1,420,422.  
Patented June 20, 1922.

Witness:
John Enders

Inventor:
William A. Foss
By Fred Gulach
his Atty.

UNITED STATES PATENT OFFICE.

WILLIAM A. FOSS, OF CLEVELAND, OHIO.

ARTIFICIAL BAIT.

1,420,422.  Specification of Letters Patent.  Patented June 20, 1922.

Application filed November 5, 1920. Serial No. 421,817.

*To all whom it may concern:*

Be it known that I, WILLIAM A. Foss, a citizen of the United States, and a resident of Cleveland, in the county of Cuyahoga and State of Ohio, have invented certain new and useful Improvements in Artificial Bait, of which the following is a full, clear, and exact description.

The invention relates to artificial bait.

In the use of artificial bait in which fibrous lure made up, for example, of bucktail or feathers is secured to the hook, the lure is condensed or bunched as it is drawn through the water. The primary object of the present invention is to provide means associated with such lure which will hold the fibers so they will not become bunched and will be held so they will be spread while the bait is being drawn through the water.

The invention consists in the novel features hereinafter set forth and more particularly defined by claims at the conclusion hereof.

Figure 1:
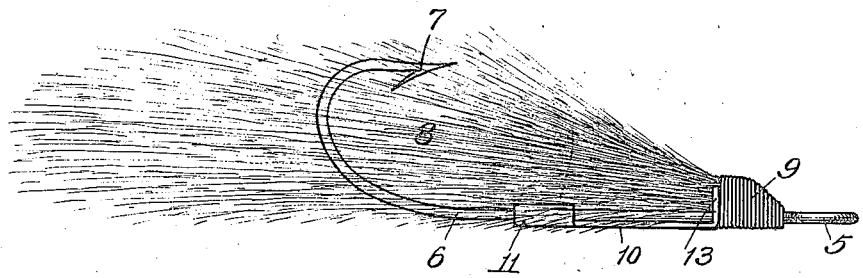
Figure 2:
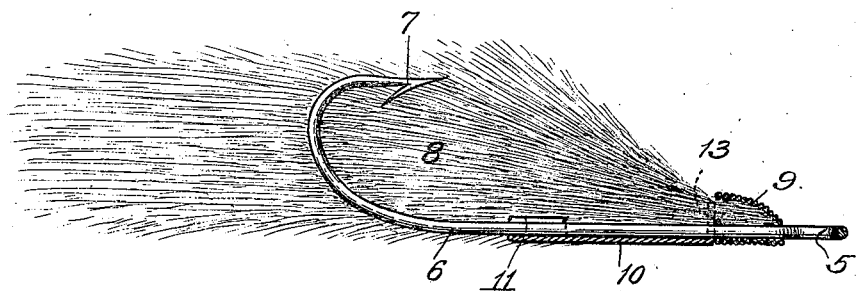
Figure 3:
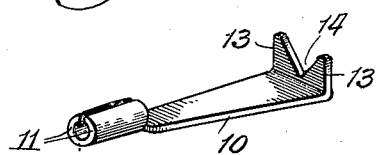

In the drawings: Fig. 1 is a side elevation of a bait embodying the invention. Fig. 2 is a longitudinal section. Fig. 3 is a perspective of the lure holder.

The invention is exemplified in a bait comprising a hook which has an eye 5 at one end by which it may be attached to any suitable fishing tackle, a shank 6 and a prong or hook proper 7. The front end of the fibrous lure 8 is rigidly attached to the hook by a wire wrapping 9 which is usually coated with a water-proof material. The fiber is attached so that the rear ends of the fibers will be free and will be spread apart, because, in practice, the lure is more readily visible and will conceal the hook proper when the fibers are spread apart. A holder for the fibrous lure is formed of a plate or strip of metal 10 which is provided with tongues 11 which are folded around the shank 6 to secure the holder thereon and the body of the plate is usually further secured to the hook by solder. The front end of the holder is provided with upstanding tongues 13 to straddle the shank 6 and the fibers of the lure 8, the notch 14 between the tongues 13 being preferably V-shaped. This holder for the fibers prevents them from becoming bunched or condensed, particularly when there is a tendency to twist them in the water in trolling or casting. This holding device is simple in construction, is formed of a strip of sheet metal and may be easily applied to a hook with a fibrous lure thereon.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In artificial bait, the combination of a fish hook comprising a shank and a hook proper, a fibrous lure having one end attached to the shank of the hook and extending to a point behind the hook and a device secured to the hook and provided with means for holding the fibers of the lure in spread relation behind its point of attachment and adjacent the hook proper.

2. In artificial bait, the combination of a fish hook comprising a shank and a hook proper, a fibrous lure having one end attached to the shank of the hook and extending to a point behind the hook and a device secured to the hook and provided with a plate provided with means whereby it may be secured to the shank of the hook and with means for holding the fibers of the lure in spread relation adjacent the hook proper.

3. In artificial bait, the combination of a fish-hook provided with a shank, a fibrous lure having one end attached to the hook and a plate secured to the shank and provided with upstanding means to hold the fibers of the lure rearwardly of the point where they are attached to the hook.

4. In artificial bait, the combination of a fish hook provided with a shank, a fibrous lure having one end attached to the shank and a plate secured to the shank and provided with upstanding tongues to straddle the fibers and hold them rearwardly of the point where they are attached to the hook.

WILLIAM A. FOSS.